May 19, 1936.  R. L. COLLINS  2,041,167
FUEL INJECTOR APPARATUS
Filed Sept. 11, 1934
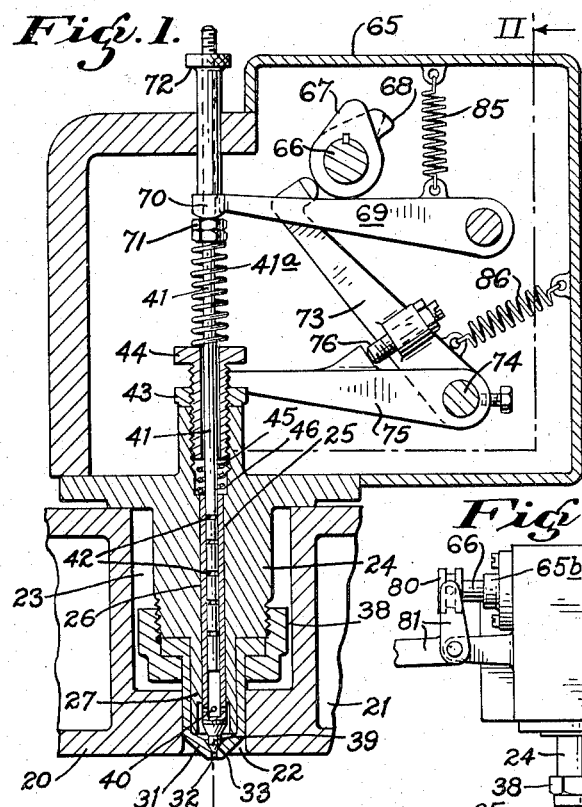
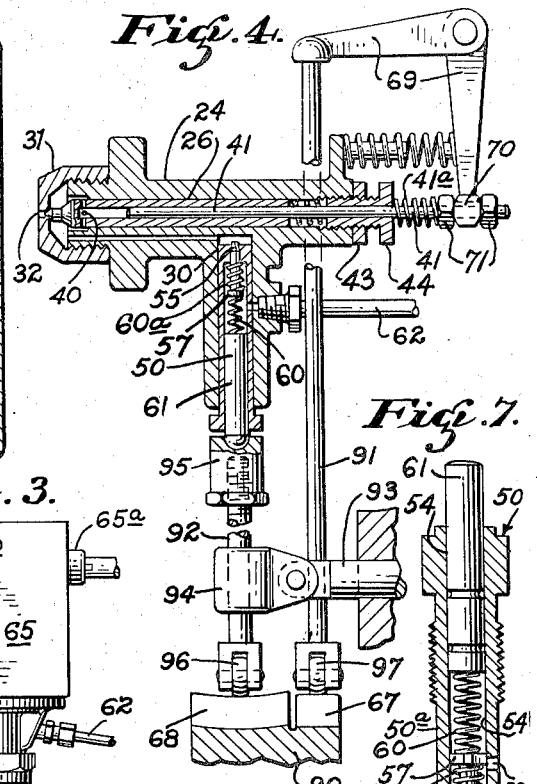
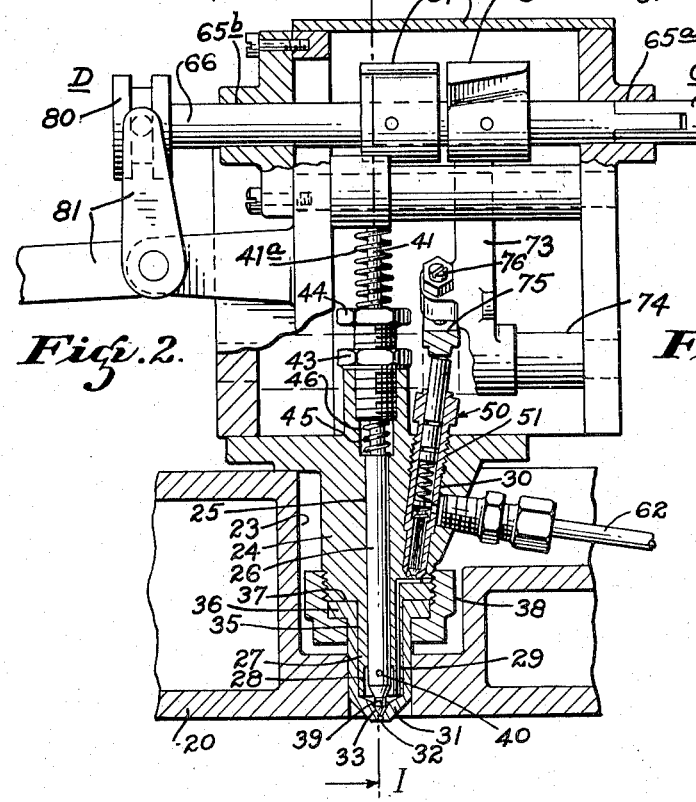
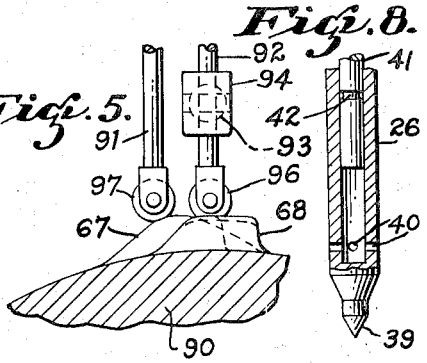
INVENTOR.
Richard L. Collins
BY
ATTORNEY Patented May 19, 1936

2,041,167

UNITED STATES PATENT OFFICE 2,041,167

FUEL INJECTOR APPARATUS

Richard L. Collins, San Francisco, Calif.

Application September 11, 1934, Serial No. 743,622

10 Claims. (Cl. 299—107.2)

This invention relates to fuel injection devices for internal combustion engines, and more particularly to fuel injection devices for internal combustion engines of the type which operate either by pressure ignition of liquid fuel or by spark ignition, but it is not intended to limit the utility of the device by these stated examples of adaptability. The apparatus finds utility in those types of engines in which fuel is injected under pressure, and the example of such use is exemplified in connection with internal combustion engines on which each combustion chamber of the engine is provided with a separate and individual fuel injection device. Internal combustion motors having such combustion chambers are well known and, briefly stated, have a reciprocable piston therein which is adapted to compress air in the cylinder chamber to a very considerable degree.

It is the purpose of injection devices of the character embodied in the present invention to spray into the chamber a charge of atomized hydro-carbon which in its atomized form is instantly combustible within the cylinder chamber, and thus provide force to reciprocate the piston in the cylinder chamber. It will be observed that the pressure necessary to inject the hydro-carbon fuel must be capable of creating a compression or pressure force greater than the maximum compression in the combustion chamber, and that the compression or working stroke of the injection apparatus is preferably to be timed so as to be most effective at the instant of maximum compression in the combustion chamber. In any internal combustion engine, it is necessary to control the power output of the motor under the various operating conditions. Fuel injection devices of this character have heretofore been provided with a very large number of intricate parts adapted for relative movement, and such parts cause friction and wear which ultimately causes the injection device to leak under the stimulus of the high degree of pressure which is necessary for condensing and atomizing the liquid fuel into a combustion chamber in which the air also has been compressed to a very high degree by the piston stroke therein.

Since the amount of fuel injected is primarily responsive to the period over which the injection takes place, and since it also advantageous to have a uniform compression stroke on the fuel during its injection under various conditions of speed, it is desirable to provide for a uniform plunger stroke to exert pressure upon the fuel at the time of injection, and to regulate the time or period of injection by means of a spill-way valve which will instantly release the pressure in the chamber within which the fuel is being compressed by the plunger stroke.

It is therefore among the objects of this invention to provide an injection device for heavy hydro-carbon fuel in which the discharge compression stroke is substantially constant and uniform and to provide a novel type of release valve for adjustability of time of fuel injection.

A further object of the invention is to provide a novel injection apparatus in which the opening and closing of the injection period will be sharply defined.

Other objects of the invention are to provide an injection device in which the frictional movement of related parts is reduced to a minimum; to provide such a device which is simple in construction, efficient in operation, and adapted for sturdy construction without increase of size or weight sufficiently to militate against the use of the structure on both large and small motors of the type of the internal combustion type.

With the foregoing and other objects in view, all of which will be more apparent as this description proceeds, the invention is exemplified in one form in the novel construction and combination of parts hereinafter described, illustrated in the accompanying drawing, and pointed out in the claims hereto appended, it being understood that various changes in the form, proportion, size, and details of construction of the apparatus may be resorted to within the scope of the appended claims, without departing from the spirit or sacrificing any of the advantages of the invention.

To more clearly comprehend the invention, reference is directed to the accompanying drawing, wherein:—

Fig. 1 is a vertical transverse section on line I—I of Fig. 2.

Fig. 2 is a vertical transverse section on line II—II of Fig. 1.

Fig. 3 is a side elevation of a suitable housing for the invention, principally to show the relative placement of parts.

Fig. 4 is a vertical transverse section of a modified form of the invention.

Fig. 5 is a fragmentary vertical section of suitable cam mechanism for operation of device of Fig. 4.

Fig. 6 is a perspective view of irregular cam adapted for use in the devices of either Figs. 1 and 2, or Fig. 4.

Fig. 7 is an enlarged vertical transverse section showing detail of relief valve.

Fig. 8 is an enlarged detail in vertical section of spray valve structure.

Referring to the drawing wherein like characters of reference designate corresponding parts, 20 indicates generally the walls of a combustion cylinder of an internal combustion engine having the usual and well known water-jacketed feature, indicated 21. The wall of the cylinder is provided with a fuel opening 22 communicating with a socket 23 to receive a housing block 24 which may be fixedly mounted therein in any suitable manner. The housing block 24 has an elongated tubular open bore 25 therethrough, and snugly fitted for reciprocal movement longitudinally of the bore 25 is a spray valve 26. One end of the housing block 24 is provided with an elongated neck 27, this elongated neck 27 being reamed at its end to provide a recess opening or chamber 28 communicating with the bore 25. The chamber 28 communicates with a conduit or passageway 29 which extends through the housing block and is in communication with a second recess 30 in the housing block in which is housed a valve to be hereafter described.

Mounted circumferentially of the neck 27 and enclosing the recess 28 so as to form a chamber thereof, is a spray nozzle 31 having a spray orifice 32 and an adjacent valve seat 33 which is preferably a taper. The nozzle 31 preferably has a bearing of a considerable length circumferentially of the neck 27 as at 35 and is provided with a flange 36 which seats upon a shoulder 37 of the housing block. The nozzle may be securely connected to the housing block by a clamp nut 38.

The body of the spray valve is tubular, as best shown in Figs. 1, 4, and 8, the tubular spray valve body being closed at the end adjacent the spray nozzle, and being tapered to provide a needle valve 39 to cooperate with the valve seat 33 whereby the orifice 32 of the discharge nozzle may be opened and closed. Adjacent the closed end of the spray valve and in the zone thereof within the recess chamber 28, the spray valve is provided with orifices 40 extending through the wall thereof so that the chamber 28 and the interior of the tube of the spray valve are in communication. Mounted for reciprocation in the tube of the spray valve is a plunger 41, having close sliding fit therein. The plunger may be provided with recessed annular grooves 42 for the purpose of insuring against leakage of liquid past the plunger responsive to pressure in the spray valve. Beyond the body of the spray valve, the plunger is supported with relation to the housing block by lock nuts 43, 44, with relation to which it has a snug sliding fit, the lock nut 44 also serving as a butt for a compression spring 45 which is mounted in a recess 46 in the housing block and bears at its opposite end upon the tubular wall of the spray valve normally seated at 33.

Within the second recess 30 is mounted a relief valve generally indicated 50, which may also serve as an inlet valve and spillway valve. In the exemplification herein this valve is housed in a casing 50ª which is threadedly mounted in the housing block as at 51. The casing 50ª is provided with a valve seat opening 52, an inlet opening 53, and a piston opening 54. An elongated valve stem 55 is adapted to respectively open and close the opening 52, the stem of said valve being grooved as at 56 to permit passage of fluid fuel thereby. The valve stem 55 is headed as at 57 and is actuated upwardly and free from its seat 52 by means of a spring 60ª which butts on an annular shoulder 59 in the casing. The valve 55 is actuated downwardly to its seat 52 by a compression spring 60 and by a slidable piston 61 which is actuated by a lever which is hereafter described. Connected to the housing block 24 and in communication with the opening 53 of the relief valve is a feed line 62.

The plunger 41 and piston 61 are operated by levers. In the exemplification of Figs. 1 and 2 the operating levers are within a casing 65. Extending through the casing 65 is a rotatable shaft 66 having cams 67 and 68 keyed thereon. The cam 67 is regular in its cam face and it serves to rock a pivotally mounted lever arm 69, the radius end of which is bifurcated as at 70 to straddle the plunger 41 between adjustment nuts 71, 72, the latter serving to align the upper end of the plunger and to furnish a bearing therefor through the casing wall, as best shown in Fig. 1. The cam 68 has an irregular cam face best illustrated in Figs. 2 and 6 and it contacts, upon rotation of the shaft 66, the lever arm 73 which is rockable with shaft 74. The shaft 74 also has a second lever arm 75 which is keyed to the shaft so that the lever arms 73 and 75 are substantially in bell-crank relation, but the angle of relation is adjustable by a threaded screw means 76. The shaft 66 is rotatable from any suitable source, preferably from an end portion indicated C, the shaft being rotatably mounted in suitable bearing in the wall of the casing as at 65ª and 65ᵇ. The opposite end of the shaft, indicated D, may have means whereby the shaft may be reciprocated axially, said means being herein exemplified by a grooved roller 80 operating between the jaws of a pivoted fork 81. The longitudinal movement of the shaft 66 changes the bearing of the width of the cam face of cam 68 on the lever 73 and thus regulates the period of time that the relief valve remains open or closed, since the wider the effective face of cam 68 the longer period it will effectually operate the lever 73 and thus the piston 61 of the relief valve.

Bearing in mind the high speed at which these levers will be actuated, means may be provided whereby the levers may be tensioned against the face of the cam and thus make their return stroke after the effective cam face has disengaged them more rapid and more positive, and thus avoid unnecessary vibration of the lever arms. Such a means is herein disclosed as tension springs, 85 and 86. A compression spring 41ª may also be mounted on the shaft on plunger 41 to facilitate the return stroke of the plunger.

Referring to the modification of Fig. 4, the design of which is particularly adapted for use with radial and rotary type combustion engines for aeroplanes and the like, the mechanical parts or elements of Fig. 4 are substantially the same as those of Figs. 1 and 2, as indicated by similar reference characters. The operating cams, however, are made a part of a rotating cam ring 90 and the respective cams are effective to operate the plunger 41 and relief valve 50 through rocker shafts 91 and 92, the shaft 91 and cam 67 operating the plunger of the spray valve and the shaft 92 and cam 68 serving to operate the relief-inlet valve. In this modification, the adjustment means for regulating the period of injection consists in providing a throttle, 93, which is connected as at 94 to the rocker shaft 92 of the inlet-relief valve so that said shaft 92 may be moved laterally across the face of the cam 68 and thus engage varying effective face portions thereof, the face of the cam 68 being arcuately formed as indicated in Fig. 4, and the shaft 92 having pivotal relation to the valve piston 61 by means of an adjustable nut 95. If desired, anti-friction rollers 96 and 97 may be employed at the contact between the rocker shafts 91 and 92 and the cams 67 and 68.

The mode of operation is as follows:—

The spray valve 26 acts as a pump cylinder, the pump plunger 41 reciprocably operating inside thereof. The inlet-relief valve 50a acts as an inlet valve during the upward or inlet stroke of the plunger 41, and as a relief or cut-off valve during the downward or injection stroke of the plunger. The inlet-relief valve is opened and closed respectively, by springs 60, and 60a. The closing is accomplished by the heavier tension to the spring 60 and the piston 61. Opening of the relief valve is accomplished by releasing the tension on the heavier spring 60 and allowing the lighter spring 60a to become effective; and the opening of said valve is further responsive to the pressure on the liquid in the chamber 28 and the conduit 29, responsive to pressure exerted by the plunger 41. The plunger 41 and the relief valve 50 are so synchronized in their respective timing that on the up stroke of the plunger 41 the relief-inlet valve is opened at its seat 52 so that fuel may flow through the feed 62 and conduit 29 and into the chamber 28 and be introduced into the interior of the hollow injection valve 26.

When the cam 67 is effective to depress plunger 41, the valve 50 closes on its seat 52 responsive to the action of cam 68. Thus a high degree of compression is exerted by the plunger 41 upon the liquid fuel in the chamber 28, and due to the relatively larger area of spray valve 26 within chamber 28, this pressure is effective at its substantial maximum to lift the valve stem 39 from its seat 33 against the compression of spring 46, thus permitting an injection of fuel in atomized form through the minute orifice 32 into the combustion chamber of the motor. It is only necessary that the spray valve stem 26 shall raise from its seat a few thousandths of an inch, thus practically eliminating frictional wear between the exterior of the valve and the housing block 24. This arrangement eliminates frictional wear between relatively moving parts and substantially limits such wear to the relative movement between plunger 41 and the internal wall of spray valve 26; and in case such wear does occur at this particular point of contact, the parts are small, easily removed, and may be replaced without disturbing the other mechanism of the injection device.

The effective face of cam 68 is so arranged that the period of time during which the relief valve 50 will remain closed or open respectively, may be varied and thus vary the time of the injection by the valve 26 into the cylinder chamber, since, if the valve stem 55 is not seated, the fluid, upon exertion of pressure by the plunger 41 will seek the line of least resistance through the conduit 29 and through the feed conduit 62. The relief valve may also be adjusted by the screw 76 so as to adjust the tension on spring 60, and thus the pressure at which the relief valve stem 55 will open will determine the pressure in the chamber 28. In such adjustment, the pressure to open the relief valve must always be maintained greater than the pressure required to raise the injection spray valve.

It will be noted from the perspective view of Fig. 6, that one portion of the face of cam 68 has a gradual rise and the opposite face has a sheer decline. This is arranged in this manner so that the valve stem 55 of the relief valve will seat rather slowly during the compression stroke of plunger 41 so that the plunger can build up pressure on the oil. Just prior to the time that the cam 67 reaches the peak of its effectiveness on the plunger 41 the valve stem 55 becomes completely seated and the pressure of the oil then raises the valve stem 26 and thus the injection is sharply defined and instantaneous and substantially its full force. In other words, injection lag is avoided. It will be further noted that the sheer or decline face of the cam 68 permits the valve stem 55 to be opened suddenly and thus terminate the injection of fuel suddenly by releasing the pressure in the chamber 28.

Having thus described my invention, what I claim and desire to secure by Letters Patent is:—

1. An injection device of the character described including a housing having a tubular opening provided with a discharge orifice, a tubular spray valve reciprocably mounted in the tubular opening and having orifices through the wall thereof in communication with the tubular opening of the housing, a plunger reciprocably mounted internally of the spray valve, means for reciprocating said plunger with a constant stroke, a relief valve in communication with the tubular opening in the housing, and means to close said relief valve during a pressure stroke of the plunger, said relief valve including resilient tension means adapted for permitting the relief valve to open responsive to pressure of the plunger stroke.

2. An injection device of the character described including a housing having a tubular opening provided with a discharge orifice, a tubular spray valve reciprocably mounted in the tubular opening and having orifices through the wall thereof in communication with the tubular opening of the housing, a plunger reciprocably mounted internally of the spray valve, means for reciprocating said plunger with a constant stroke, a relief valve in communication with the tubular opening in the housing, said relief valve including a high tension resilient means and a low tension resilient means and means operable through said high tension resilient means for actuating the relief valve to a closed position.

3. An injection device of the character described including a housing having a tubular opening provided with a discharge orifice, a tubular spray valve reciprocably mounted in the tubular opening and having orifices through the wall thereof in communication with the tubular opening of the housing, a plunger reciprocably mounted internally of the spray valve, means for reciprocating said plunger, a relief valve in communication with the tubular opening in the housing, said relief valve including a high tension spring and a low tension spring, and means operable through said high tension spring for actuating the relief valve to a closed position.

4. An injection device of the character described including a housing having a valve controlled feed conduit for fuel and having a tubular ejection member in communication with the feed conduit and provided with a discharge orifice, a valve for controlling flow of fluid in said tubular member, and a reciprocable compression plunger, means for reciprocating said plunger, a combined feed and relief valve in said fuel feed conduit, said valve having a high tension resilient means and a low tension resilient means, means to close said valve through said high tension resilient means, said high tension resilient means being adapted to permit the combined valve to open responsive to pressure by the plunger on the fluid fuel, and said low tension resilient means being adapted for maintaining the said valve free of its seat when the said means to close the valve is inoperative.

5. An injection device of the character described including a housing having a feed conduit for fuel and a tubular opening in communication with the feed conduit and provided with a discharge orifice, a tubular spray valve and a plunger reciprocably mounted in the tubular opening, means for reciprocating said plunger, a combined feed and relief valve in said fuel feed conduit, said valve having a high tension spring and a low tension spring, valve closing means operable through said high tension spring for actuating the relief valve to a closed position, said high tension spring being also adapted to permit the combined valve to open responsive to pressure by the plunger on the fluid fuel, and means for adjusting the time during which the valve closing means is effective.

6. In a fluid fuel injection device having a housing provided with a feed conduit for fluid fuel and a tubular chamber communicating with the feed conduit and provided with a discharge orifice, and a tubular spray valve and a plunger reciprocably mounted in the tubular chamber, a combined feed and relief valve in the feed conduit, said combined valve comprising a tubular body provided with an opening for communication with a feed supply line, a valve seat, a valve stem, a high tension spring, a low tension spring, and a piston, said low tension spring being adapted for opening the valve when pressure is absent from the high tension spring, and said high tension spring being adapted for actuating the valve stem to its seat responsive to pressure on the said piston, said valve stem being operable to open against said high tension spring responsive to pressure of the plunger on fluid fuel in the tubular chamber and means for adjusting the tension of the high tension spring.

7. In a fluid fuel injection device having a housing provided with a feed conduit for fluid fuel and a tubular chamber communicating with the feed conduit and provided with discharge orifice, and a tubular spray valve and a plunger reciprocably mounted in the tubular chamber, a combined feed and relief valve in the feed conduit, said combined valve comprising a tubular body provided with an opening for communication with a feed supply line, a valve seat, a valve stem, a high tension spring, a low tension spring, and a piston, said low tension spring being adapted for opening the valve when pressure is absent from the high tension spring and said high tension spring being adapted for actuating the valve stem to its seat responsive to pressure on the piston, said valve stem being operable to open against said high tension spring responsive to pressure of the plunger on fluid fuel in the tubular chamber and means for adjusting the tension of the high tension spring.

8. In a fluid fuel injection device having a housing provided with a feed conduit for fluid fuel and a tubular chamber communicating with the feed conduit and provided with a discharge orifice, and a tubular spray valve and a plunger reciprocably mounted in the tubular chamber, means for closing the said conduit subject to opening thereof responsive to pressure by the plunger on the fluid fuel in the tubular opening, said means comprising a combined feed and relief valve in the feed conduit, said combined valve comprising a tubular body provided with an opening for communication with a feed supply line, a valve seat, a valve stem, a high tension spring, a low tension spring and a piston, said low tension spring being adapted for opening a valve when pressure is absent from the high tension spring and said high tension spring being adapted for actuating the valve stem to seat responsive to pressure on the said piston, said valve stem being operable to open against said high tension spring responsive to pressure of the plunger on fluid fuel in the tubular chamber, and means for actuating the said combined valve to a closed position and means for adjusting the time during which the relief valve is maintained closed.

9. In a fluid fuel injection device having a housing provided with a feed conduit for fluid fuel and a tubular chamber communicating with said conduit and provided with a discharge orifice, and a tubular spray valve and a plunger reciprocably mounted in the tubular chamber, means for closing the said conduit subject to opening thereof responsive to pressure by the plunger on fluid fuel in the tubular chamber, said means comprising a combined feed and relief valve in the said conduit, said combined valve comprising a tubular body provided with an opening for communication with a feed supply line, a valve seat, a valve stem, a high tension spring, a low tension spring, and a piston, said low tension spring being adapted for opening the valve when pressure is absent from the high tension spring, and said high tension spring being adapted for actuating the valve stem to its seat responsive to pressure on the said piston, said valve stem being operable to open against said high tension spring responsive to pressure of the plunger on fluid fuel in the tubular chamber, means for actuating the combined valve to a closed position through said high tension spring and means for adjusting the time during which the said combined valve is maintained closed, said means for actuating the relief valve to a closed position including a cam adapted to exert a gradual closing pressure on said combined relief valve and to release said pressure relatively quickly.

10. An injection device of the character described including a housing having a valve controlled feed conduit for fuel and having a tubular opening in communication with the feed conduit, said tubular opening being provided with a discharge orifice, a tubular spray valve reciprocably mounted in the tubular opening and having orifices through the wall thereof in communication with the tubular opening of the housing, a plunger reciprocably mounted internally of the spray valve, means for reciprocating said plunger with a constant stroke, a relief valve for controlling pressure in the said tubular opening, said relief valve having a high tension and low tension resilient means, means operable through the high tension resilient means for actuating the relief valve to a closed position, said relief valve being operable against the high tension means responsive to pressure of the plunger on fluid fuel in the said tubular opening of the housing while the relief valve closing means is effective.

RICHARD L. COLLINS.